US006305228B1

(12) United States Patent
Kimura et al.

(10) Patent No.: US 6,305,228 B1
(45) Date of Patent: Oct. 23, 2001

(54) PRESSURE SENSOR DEVICE AND SUCTION RELEASE APPARATUS

(75) Inventors: Masahito Kimura; Kouki Kagaya, both of Akita-ken; Yutaka Sato, Tokyo, all of (JP)

(73) Assignee: Myotoku Co., Ltd., Tokyo (JP)

( * ) Notice: Subject to any disclaimer, the term of this patent is extended or adjusted under 35 U.S.C. 154(b) by 0 days.

(21) Appl. No.: 09/483,878

(22) Filed: Jan. 18, 2000

(30) Foreign Application Priority Data

Jan. 18, 1999 (JP) ........................................ 11-009432

(51) Int. Cl.[7] ........................................ G01L 9/00
(52) U.S. Cl. ........................................ 73/749
(58) Field of Search .................... 73/37, 749, 753, 73/1.57, 747; 137/487.5, 502, 557, 560, 526, 536, 884; 294/64.1, 64.2, 65, 907

(56) References Cited

U.S. PATENT DOCUMENTS

| | | | |
|---|---|---|---|
| 4,687,021 | 8/1987 | Ise et al. | 137/526 |
| 5,201,560 | 4/1993 | Golden | 294/64.2 |
| 5,324,087 | 6/1994 | Shimose et al. | 294/64.1 |
| 5,481,482 | 1/1996 | Nagai et al. | 73/4 V |

FOREIGN PATENT DOCUMENTS

| | | |
|---|---|---|
| 0 603 395 A1 | 6/1994 | (EP) . |
| 4-268612 | 9/1992 | (JP) . |
| 7-9380 | 1/1995 | (JP) . |

*Primary Examiner*—William Oen
(74) *Attorney, Agent, or Firm*—Knobbe, Martens, Olson & Bear, LLP

(57) ABSTRACT

When a suction/breakdown instruction signal is changed over from a high state to a low state, a vacuum generating electro-magnetic valve is turned on (the vacuum release electro-magnetic valve is closed). If the negative pressure in the pressure tube is equal to or greater than a determining value, suction breakdown confirmation output is turned on. When the delay time has lapsed from this time, the vacuum generating electro-magnetic valve is turned off. When the pressure in the pressure tube is smaller by a predetermined value than the suction determining value, the output of the suction breakdown confirmation is turned off. When the delay time has lapsed since the change-over time from the low state to the high state, the vacuum release electro-magnetic valve is turned on. When the positive pressure in the pressure tube is equal to or greater than the breakdown determining value, the output of the suction breakdown confirmation is set to the high state. When the breakdown time has passed from this time T6, the vacuum release electro-magnetic valve is turned off.

15 Claims, 16 Drawing Sheets

SUCTION TRANSPORTING OF A CYLINDRICAL WORK

OPERATION MODE 1

PRESSURE SENSOR DEVICE AND SUCTION RELEASE APPARATUS

BACKGROUND OF THE INVENTION

1. Field of the Invention

The present invention relates to a pressure sensor device and a suction release apparatus, and more particularly to a pressure sensor device which is provided in a pressure generating apparatus for setting the inside of a pressure tube in a negative pressure with a negative pressure-generating valve for generating the negative pressure, and setting the inside of a pressure tube to a positive pressure with a positive pressure-generating valve for generating the positive pressure, the pressure sensor device being provided for detecting the pressure inside the pressure tube.

2. Description of the Related Art

Conventionally, there is proposed a pressure generating system for suctioning work by placing the interior of a pressure tube connected to a work in a negative pressure state (a vacuum state but not a complete vacuum state). Note that the pressure generating apparatus is provided with a pressure sensor device for detecting the pressure (either positive pressure or negative pressure) inside a pressure tube and displaying the pressure detected inside the pressure tube.

In the above pressure generating system, the vacuum generating electro-magnetic valve is opened to place the interior of the pressure tube in a negative pressure state. Namely, the pressure generating system allows compressed air supplied from a compressor (on the primary side) to flow into a diffuser by opening the vacuum generating electro-magnetic valve. Along with this, the interior of the pressure tube is placed in a negative pressure state by cawing the air in the pressure tube (on the secondary side) to flow into the diffuser.

Further, in this pressure generating system, in order to place the interior of the pressure tube in a positive pressure state, the vacuum generating electro-magnetic valve is closed and a vacuum release electro-magnetic valve is opened. Namely, in this pressure generating system, by closing the vacuum generating electro-magnetic valve and opening the vacuum release electro-magnetic valve, compressed air supplied from the compressor (primary side) can be prevented from flowing into the diffuser and can be made to flow into the pressure tube, thereby placing the interior of the pressure tube in a positive pressure state. Note that the term “breakdown” is used because compressed air is made to flow into the interior of the pressure tube thereby breaking down the state of vacuum which had existed in the pressure tube.

However, a sequencer located outside the pressure generating apparatus directly controls the vacuum generating electro-magnetic valve and the vacuum release electro-magnetic valve with the result that a control load of the sequencer is large. In particular, when various types of control have to be performed on the vacuum generating electro-magnetic valve and the vacuum release electro-magnetic valve because of the type of work (the weight and the state of the suction surface), because the sequencer has to perform each of the controls, the control load becomes increasingly larger.

Furthermore, when the pressure sensor device detects the pressure in the pressure tube and the detected positive pressure is a threshold value or greater, a positive pressure state signal is output via a first signal line. On the other hand, when the detected negative pressure is a threshold value or greater, the negative pressure state signal is output via a second signal line. In other words, two signal lines are required to output the pressure (positive pressure and negative pressure) state in the pressure tube.

SUMMARY OF THE INVENTION

The present invention has been made in view of the aforementioned fact, and an object of the present invention is to provide a pressure sensor device which reduces the external control load, and which is capable of reducing to one line the number of signal lines for outputting the state of the pressure inside a pressure tube.

In order to attain the above object, the pressure sensor device according to the first aspect of the present invention is provided in a pressure generating apparatus. The pressure generating apparatus places the interior of a pressure tube in a negative pressure state using a negative pressure-generating valve for generating negative pressure, and places the interior of the pressure tube in a positive pressure state using a positive pressure-generating valve for generating positive pressure. The pressure sensor device detects both positive pressure and negative pressure in the pressure tube.

Input device inputs an instruction signal. In the input instruction signal, a first state change-over from one of a high state having a relatively large value or a low state having a relatively small value to the other of the high state having a relatively large value or the low state having a relatively small value represents an instruction to generate negative pressure, while a second state change-over from the other of the high state having a relatively large value or the low state having a relatively small value to the one of the high state having a relatively large value or the low state having a relatively small value represents an instruction to generate positive pressure. The instruction signal is selectively changeable from a high state to a low state and vice-versa. A change of the instruction signal from one state to the other state is an instruction to generate negative pressure, and a converse change of the instruction signal is an instruction to generate positive pressure.

A control device thus controls the negative pressure-generating valve and the positive pressure-generating valve on the basis of the first state change-over and the second state change-over in an instruction signal input by the input device.

In this manner, since the pressure sensor device controls the negative pressure-generating valve and the positive pressure-generating valve on the basis of the first state change-over and the second state change-over in the instruction signal, the control load of an external device such as a sequencer or the like can be reduced.

Here, the control device may control the negative pressure-generating valve and the positive pressure-generating valve in accordance with an operation mode selected from a plurality of operation modes. In this manner, since the control device of the pressure sensor device controls the negative pressure-generating valve and the positive pressure-generating valve in accordance with the operation mode selected from the plurality of the operation modes, the control load of an external device such as a sequencer or the like can be further reduced.

Furthermore, the control device may open the negative pressure-generating valve on the basis of the first state change-over and may close the negative pressure-generating valve after a predetermined time has passed before the second state change-over and since the value of the negative pressure generated in the pressure tube by the opening of the negative pressure generating valve has reached the threshold value on the negative pressure side or more.

Note that at least one of the above threshold value and the predetermined time may be able to be set.

Furthermore, the control device may open the positive pressure-generating valve when a predetermined delay time has passed after the completion of the second state change-over. Furthermore, the control device may open the positive pressure-generating valve on the basis of the second state change-over. When the value of the positive pressure generated in the pressure tube by the opening of the positive pressure-generating valve has reached the threshold value or more on the positive pressure side, the positive pressure-generating valve may be closed.

A pressure sensor device according to a second aspect of the present invention is provided in a pressure generating apparatus for placing the interior of a pressure tube in a negative pressure state using a negative pressure-generating valve for generating negative pressure and for placing the interior of the pressure tube in a positive pressure state with a positive pressure-generating valve, and the device detects positive pressure and negative pressure in the pressure tube.

An output device outputs a pressure state signal representing a state of positive pressure and negative pressure in the pressure tube via one output line.

In this manner, since the pressure state signal representing the state of positive pressure and negative pressure in the pressure tube is output via one output line, wiring can be simplified.

Here, positive pressure and negative pressure in the pressure tube can be represented in the following manner by outputting the pressure state signal via one output line.

Namely, determining means determines whether or not the positive pressure detected in the pressure tube is at the threshold value on the positive pressure side or more and, at the same time, determines whether or not the negative pressure detected in the pressure tube is at the threshold value on the negative pressure side or more.

When the determing means determines that the positive pressure detected in the pressure tube is at the threshold value on the side of the positive pressure or more, the output device changes the pressure state signal from the high state to the low state or vice versa. When the determing means determines that the negative pressure detected in the pressure tube is at the threshold value on the side of the negative pressure or more, the output device changes the pressure state signal over from the low state to the high state or vice versa.

In this way, when the determing means determines that the positive pressure detected in the pressure tube is not less than the threshold value on the positive pressure side, the pressure state signal is changed from a low state to a high state or vice versa. When the determing means determines that the negative pressure detected in the pressure tube is not less than the threshold value on the negative pressure side, the pressure state signal is changed from a high state to a low state or vice versa. Therefore, positive pressure and negative pressure in the pressure tube can be displayed by the state of the pressure state signal.

Note that the threshold value may be able to be set.

Here, if the determining means determines that the detected positive pressure is not less than the threshold value on the side of the positive pressure, the determining means further whether or not the detected positive pressure is less than or equal to a value which is smaller by a predetermined value than the threshold value on the side of the positive pressure. At the same time, if the determining means determines that the detected negative pressure is not less than the threshold value on the side of the negative pressure, the determining means further determines whether or not the detected negative pressure is less than or equal to a value which is smaller by a predetermined value than the threshold value on the side of the negative pressure. If the determining means determines that the detected positive pressure is less than or equal to a value which is smaller by a predetermined value than the threshold value on the side of the positive pressure, the pressure state signal may be changed over from the high state to the low state or vice versa. If the determining means determines that the detected negative pressure is less than or equal to a value which is smaller by a predetermined value than the threshold value on the side of the negative pressure, the pressure state signal may be changed over from the low state to the high state or vice versa. Note that the predetermined value may be able to be set.

DESCRIPTION OF THE PREFERRED EMBODIMENTS

Embodiments of the present invention will be explained hereinbelow with reference to the drawings.

Figure 1:
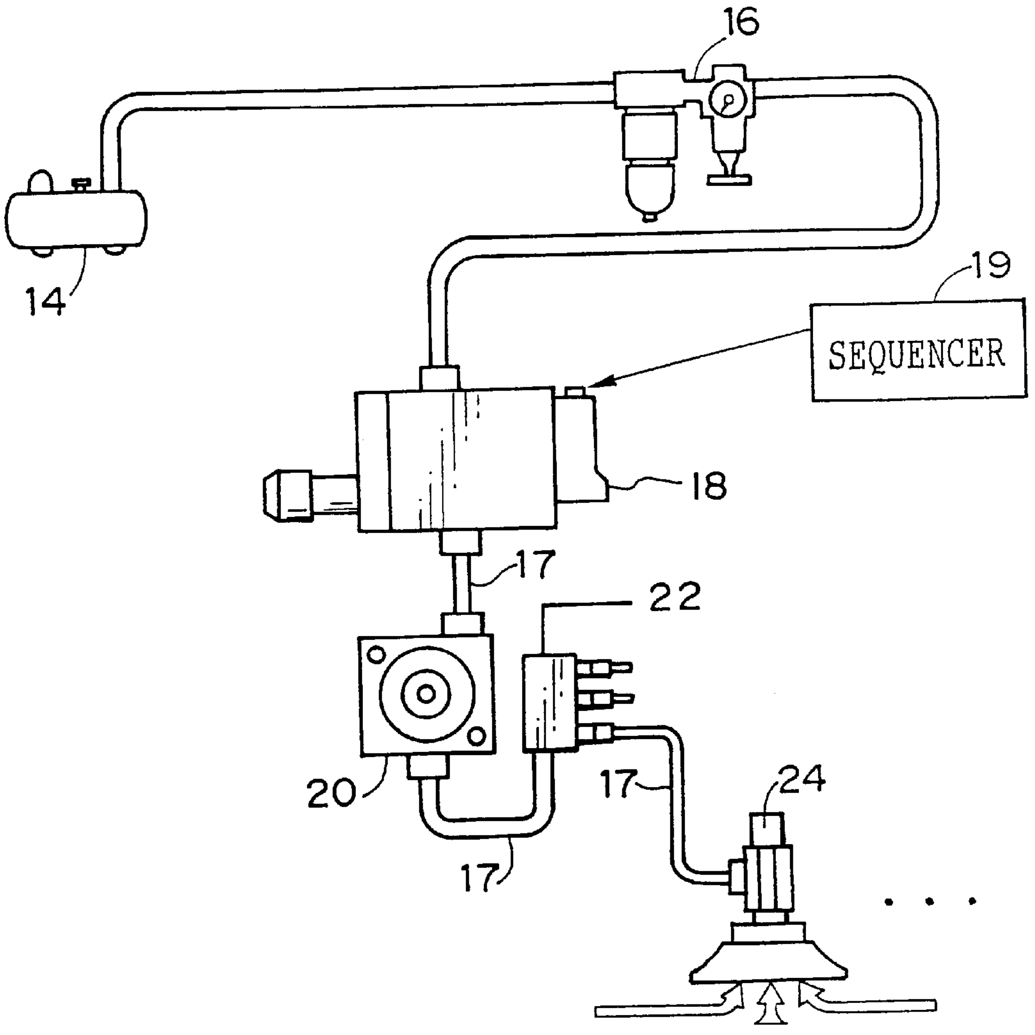
FIG. 1 is a view showing a structure of a vacuum generating system.

As shown in FIG. 1, a vacuum generating system comprises a compressor 14 for supplying compressed air, a vacuum generating device 18 (hereinafter referred to as CONVUM (registered trade mark)) as a pressure generating device for creating negative pressure (a vacuum state but not a complete vacuum state) in the interior of a pressure tube 17 with compressed air supplied from the compressor 14 via a regulator 16, and a plurality of vacuum pads 24 connected via a filter 20 and a branch tube 22 to the CONVUM 18 by the pressure tube 17.

As will be described later the CONVUM 18 is controlled by a sequencer 19, and, comprises a pressure sensor device 26, a vacuum generating electro-magnetic valve 62 as a negative pressure-generating valve, and a vacuum release electro-magnetic valve 64 (see FIG. 3) as a positive pressure-generating valve.

Figure 2A:
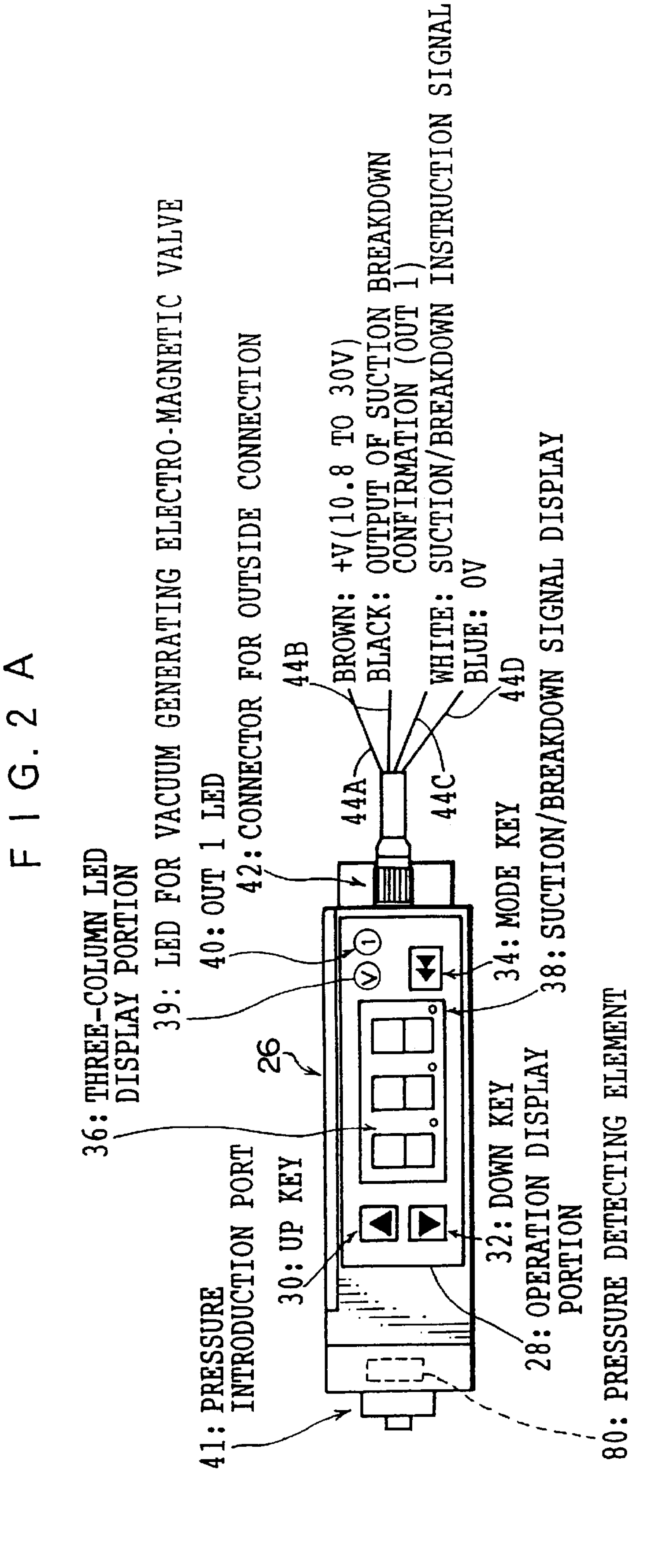
FIGS. 2A and 2B are views showing a state of a pressure sensor device.
Figure 2B:
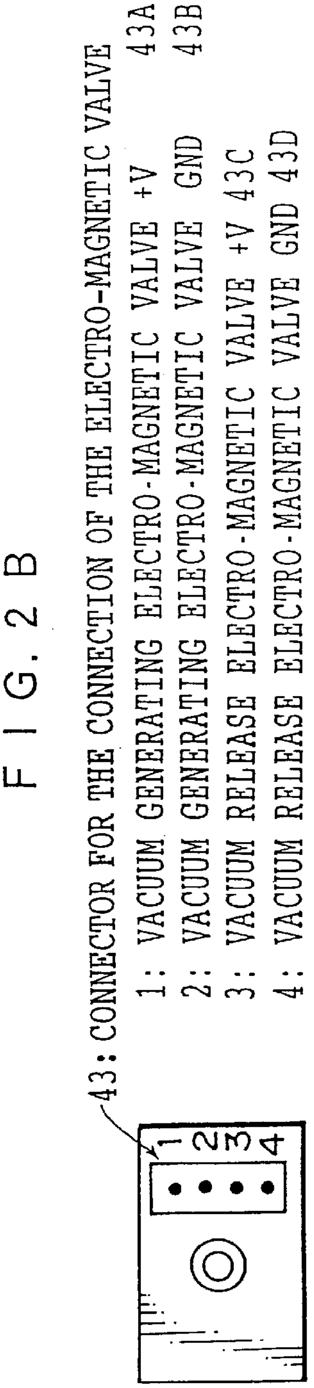

As shown in FIGS. 2A and 2B, the pressure sensor device 26 incorporated in the CONVUM 18 comprises a pressure introduction port 41 and an operation display portion 28. Inside the pressure introduction port 41, a pressure detection element 80 is provided for detecting pressure (both positive pressure and negative pressure). The operation display portion 28 is provided with a display portion 36 which is structured from an up key 30, a down key 32, and a three-column LED, amode key 34 and an LED 40. Note that, an LED for a decimal point is provided in each column of the display portion 36 that is formed from three LED columns. The LED 38 for the decimal point on the right end in FIG. 2A is used for the display of a suction/breakdown signal described later which is formed in such a manner that the LED is lit when the suction/breakdown instruction signal is set to a low state. The LED 40 is lit when the suction/breakdown signal described later is turned on. Moreover, the pressure sensor device 26 is connected to the CONVUM 18 by connecting the pressure introduction port 41 to a pressure tube 17. Further, the pressure sensor device 26 is provided with a connector 42 for an outside connection. To the connector 42 for the outside connection, wiring 44A for a power source, wiring 44B for a comparative output (a pressure state signal), wiring 44C for suction/breakdown instruction input (an instruction signal), and wiring 44D for a grounding are connected. In addition, as shown in FIG. 2B, a connector 43 for the connection of the electro-magnetic valve is provided. To the connector 43 for the connection of the electro-magnetic valve, a power supply line 43A to a vacuum generating electro-magnetic valve 62, a grounding line 43B to the vacuum generating electro-magnetic valve 62, and a power supply line 43C to a vacuum release electro-magnetic valve 62 and a grounding line 43D to the vacuum release electro-magnetic valve 62 are connected.

Figure 3:
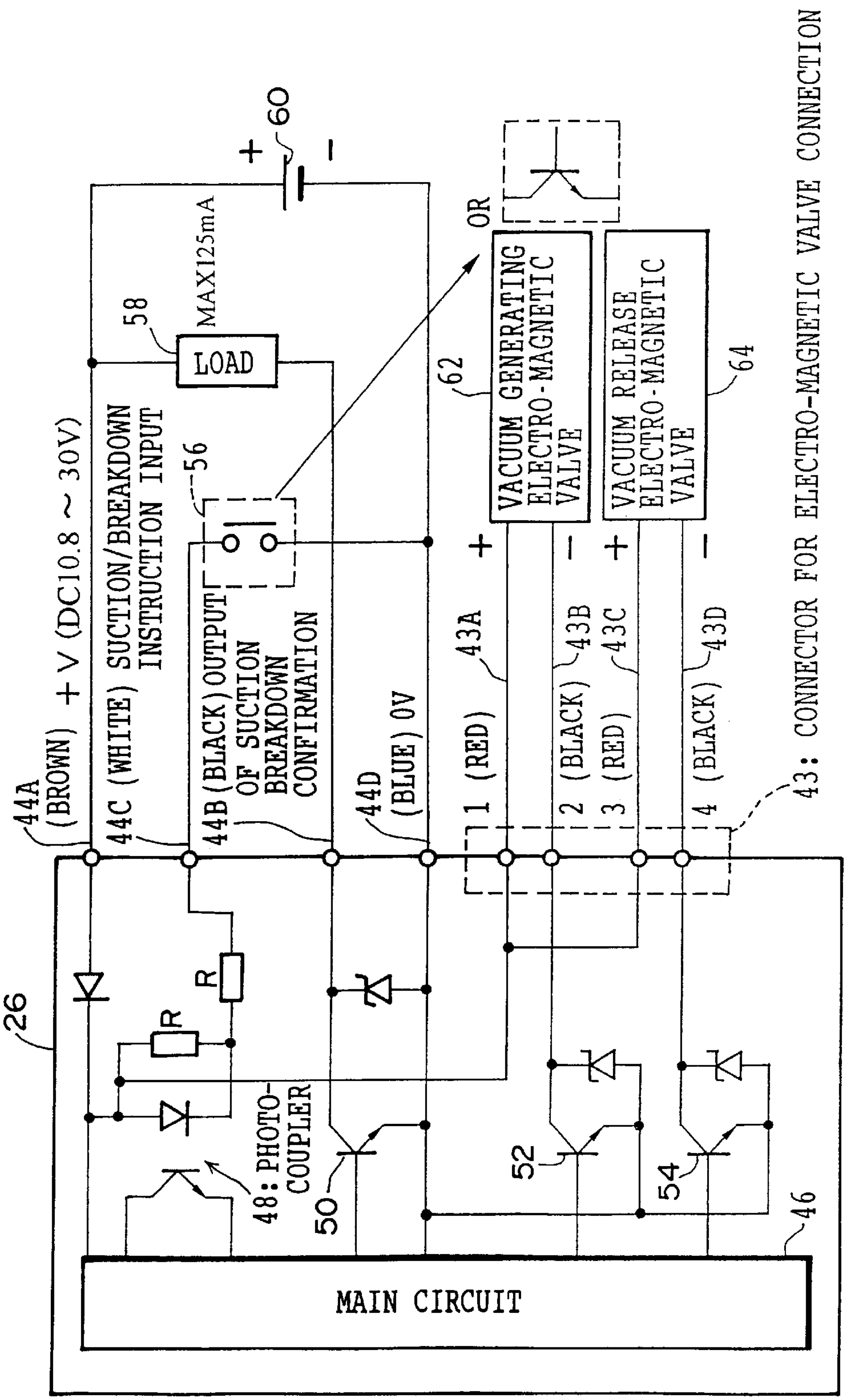
FIG. 3 is a block diagram showing the pressure sensor device.

As shown in FIG. 3, the pressure sensor device 26 is provided with a main circuit 46. The wiring 44A for the power source is connected to the main circuit 46, wiring 44C for the suction/breakdown instruction input is connected to the main circuit 46 via a photocoupler 48, and wiring 44B for a comparative output is connected to the main circuit 46 via a transistor 50 for the comparative output. Furthermore, grounding wiring 44D is connected to the main circuit 46. The wiring 44B for the comparative output is connected to a load (an electric circuit or the like for detecting the pressure state of the pressure tube 17) in the sequencer 19. The wiring 44C for the suction/breakdown instruction input is connected to the suction/breakdown instruction switch 56 (which may be constituted of transistors) in the sequencer 19. Note that the wiring 44*a* for the power source and the wiring 44D for the grounding are connected to the power source 60 provided outside the CONVUM 18 (the pressure sensor device 26). Furthermore, to the main circuit 46, the grounding line 43B to the vacuum generating electro-magnetic valve 62 is connected via the transistor 52 for the vacuum generating electro-magnetic valve, and the grounding line 43D to the vacuum release electro-magnetic valve 62 is connected via the transistor for the vacuum release electro-magnetic valve 64.

Figure 4:
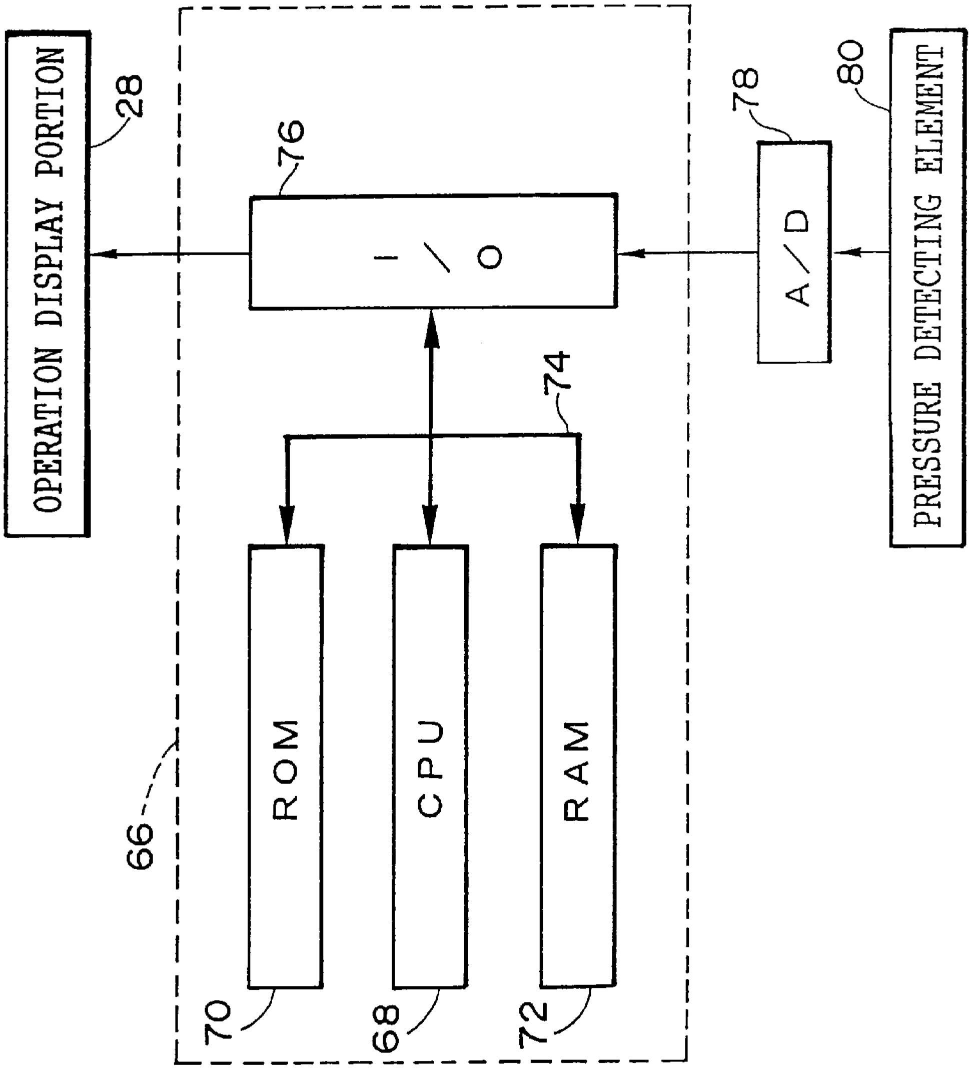
FIG. 4 is a block diagram showing a main circuit of the pressure sensor device.

As shown in FIG. 4, the main circuit 46 of the pressure sensor device 26 is provided with a microcomputer 66. The microcomputer 66 is provided with a CPU 68, ROM 70, RAM 72 and an input/output port 76. These portions are structured so as to be connected to each other by a bus 74. A pressure detection element 80 for detecting the pressure (positive pressure and negative pressure) in the pressure tube is connected to the input/output port 76 via an operation display portion 28 and an analog/digital converter 78. Note that, although omitted from FIG. 4, a photocoupler 48, a transistor 50 for the comparative output, a transistor 52 for the vacuum generating electro-magnetic valve, and a transistor 54 for the vacuum release electro-magnetic valve are connected to the input/output port 76.

Figure 5:
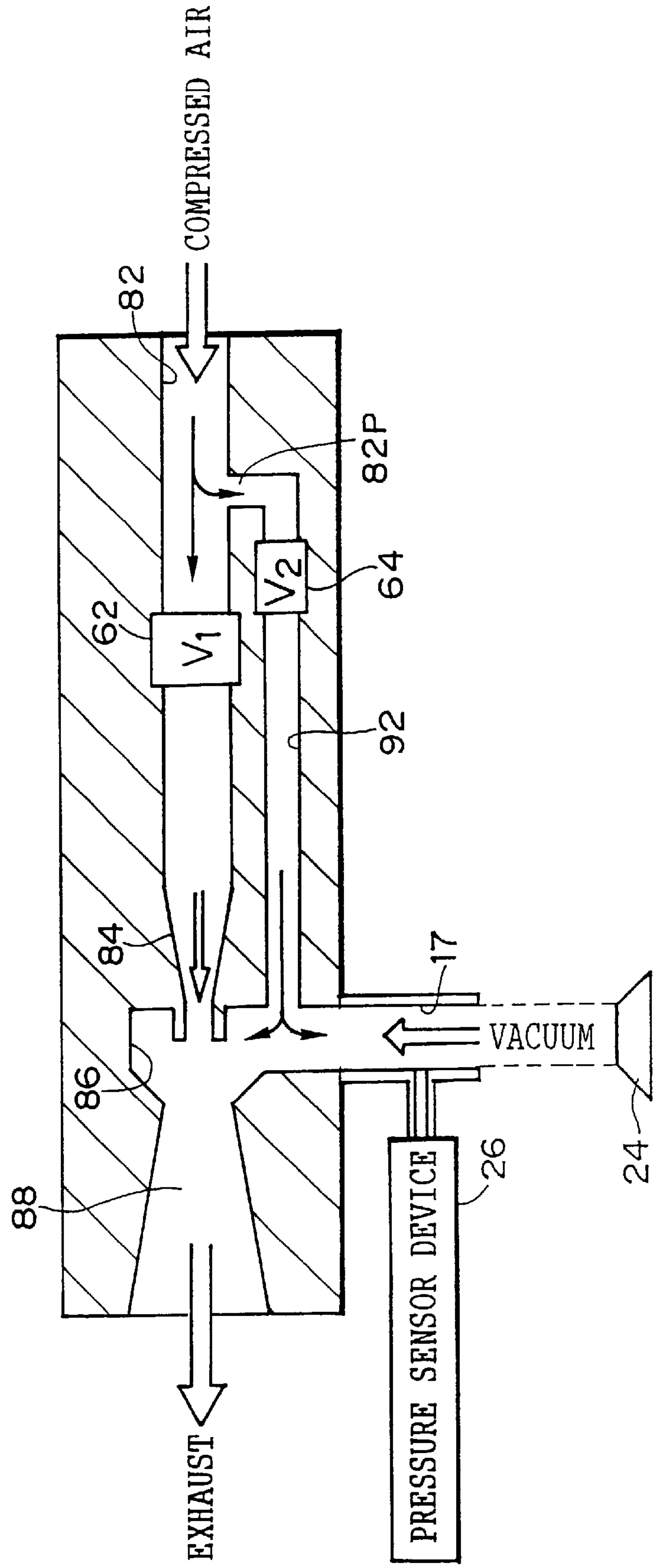
FIG. 5 is a conceptual view showing a mechanism of the vacuum generation.

Referring to FIG. 5, the mechanism of the vacuum generation of the CONVUM 18 will now be explained. Note that the example shown in FIG. 5 is simply a conceptual view for explaining the principle. The actual vacuum generating mechanism has a more complicated structure.

The vacuum generating mechanism in the CONVUM 18 is provided with a primary side tube 82 to which compressed air from the compressor 14 is supplied. The primary side tube 82 extends as far as an expansion chamber 86, and the distal end portion thereof is formed into a nozzle 84 whose diameter narrows as it approaches the expansion chamber 86. A diffuser 88 and a pressure tube 17 are connected to the expansion chamber 86. A pressure sensor device 26 is connected via a pressure introduction port 41 to the pressure tube 17. The primary side tube 82 and the pressure tube 17 are also connected via the connection tube 92 without the expansion chamber 86 inserted therebetween. A vacuum generating electro-magnetic valve 62 is provided between the connection portion 82P of the connection tube 92 and the nozzle 84 in the primary side tube 82. A vacuum release electro-magnetic valve 64 is provided inside the connection tube 92.

When the vacuum generating electro-magnetic valve 62 is opened, the compressed air from the compressor 14 is supplied to the primary side tube 82. Note that the vacuum release electro-magnetic valve 64 is closed so that the compressed air is not allowed to flow into the connection tube 92. When the compressed air is supplied to the primary side tube 82, the compressed air is throttled by the nozzle 84 before being discharged to the expansion chamber 86. When the compressed air is discharged to the expansion chamber, the compressed air expands and flows into the diffuser 88 at high speed. The pressure in the expansion chamber 86 is lowered by this high-speed flow of compressed air (i.e. a vacuum is generated). The difference between the pressure in the expansion chamber 86 and the pressure in the pressure tube 17 causes the air in the pressure tube 17 to flow into the diffuser 88. The air flow the pressure tube 17 which flows into the diffuser 88 is discharged via the diffuser 88 together with the compressed air from the compressor 14. In this manner, the interior of the pressure tube 17 is maintained in a vacuum state.

On the other hand, the breakdown of the vacuum only requires the opening of the vacuum generating electro-magnetic valve. However, because it takes a considerable time until the pressure in the pressure tube 17 is brought back to the original state, in the present embodiment, in addition to the vacuum generating electro-magnetic valve 62 being closed, the vacuum release electro-magnetic valve 64 is opened. As a consequence, compressed air from the compressor 14 flows into the pressure tube 17 via the connection tube 92 with the result that the time until the pressure in the pressure tube 17 returns to the original state is shortened.

Note that the vacuum generating system according to the present embodiment can be used for the suction and transportation of various kinds of work.

Figure 6:
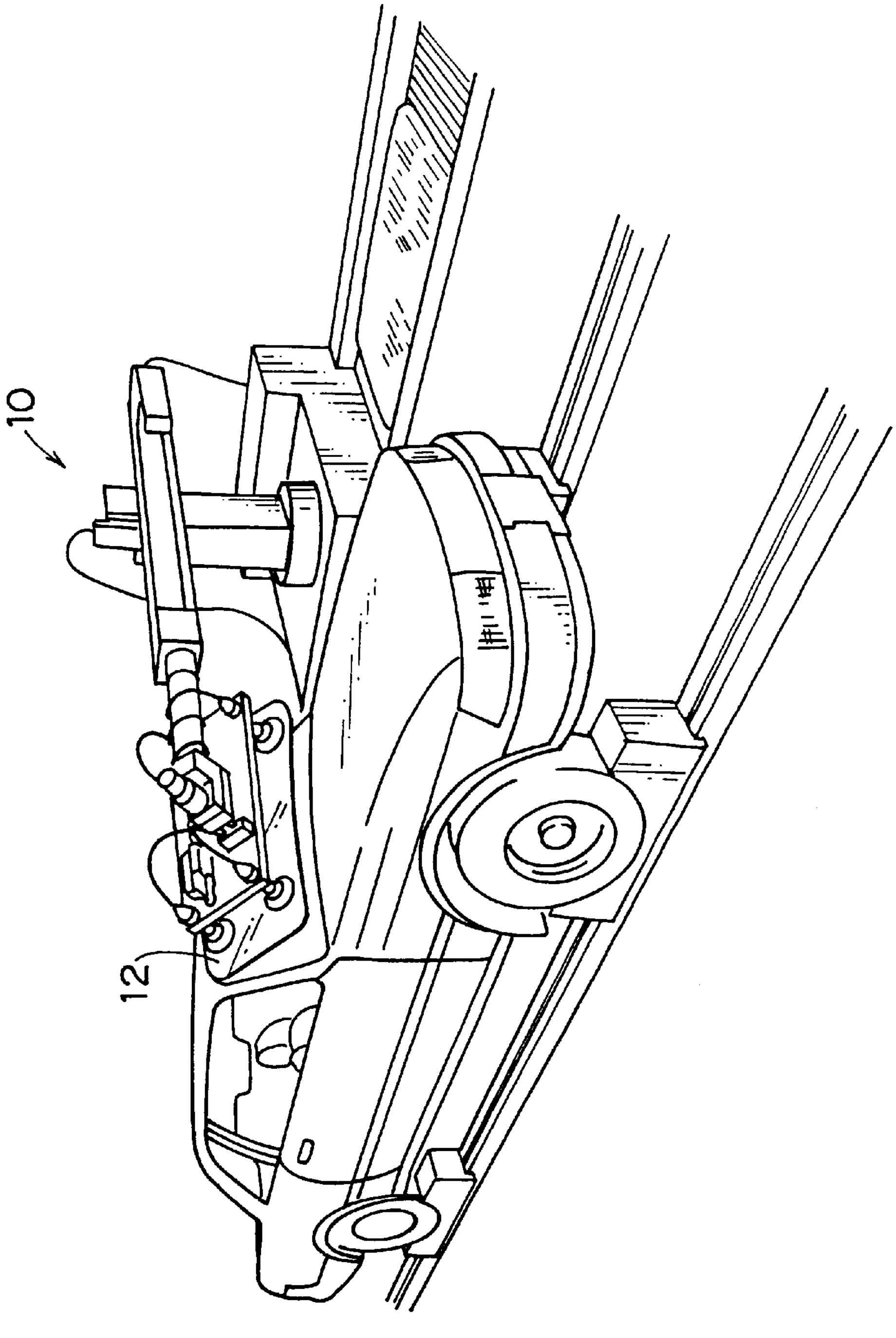
FIG. 6 is a view showing a state in which work (a front glass of an automobile) that can be reliably suctioned in a single suction operation is suctioned using the vacuum generating system.
Figure 7:
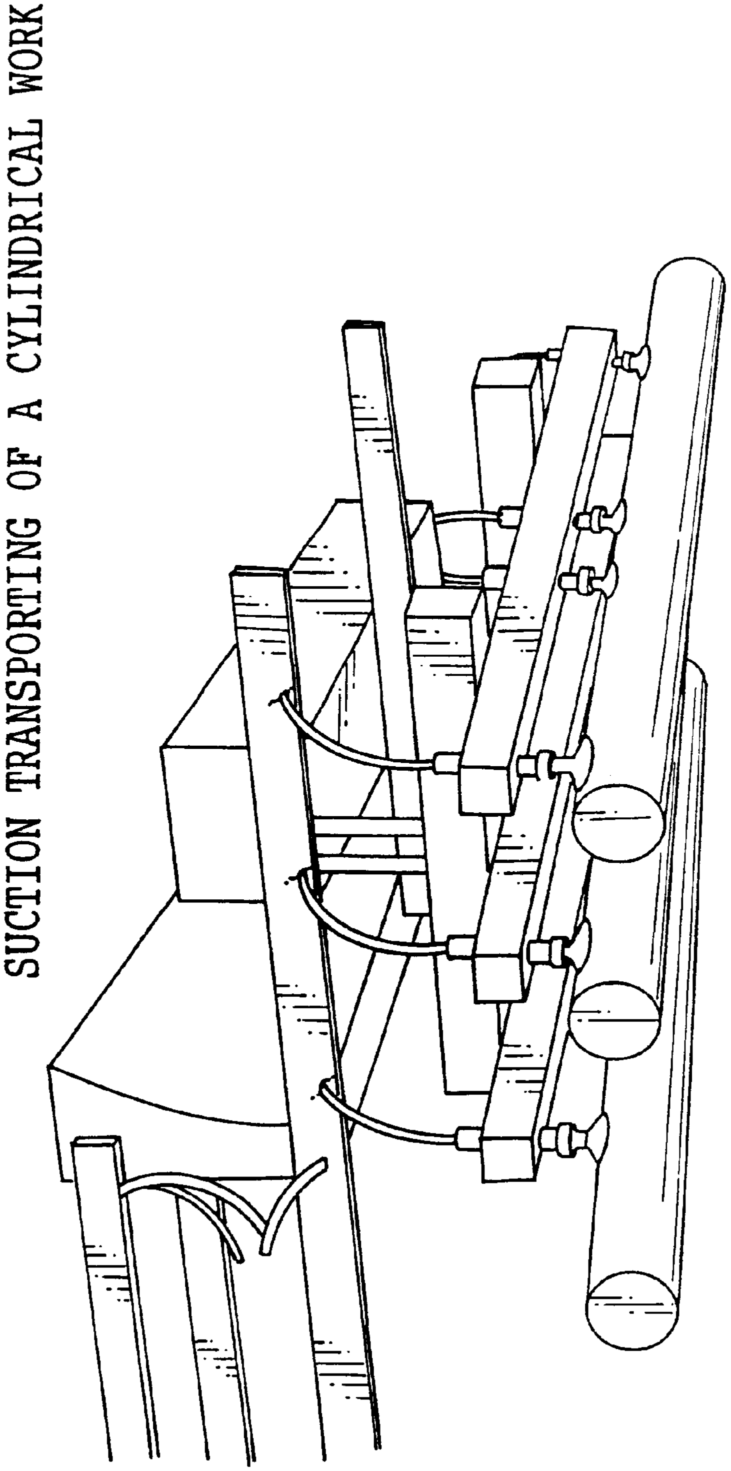
FIG. 7 is a state showing a state in which heavy work having a rough surface (a wood material) is suctioned using the vacuum generating system.
Figure 8:
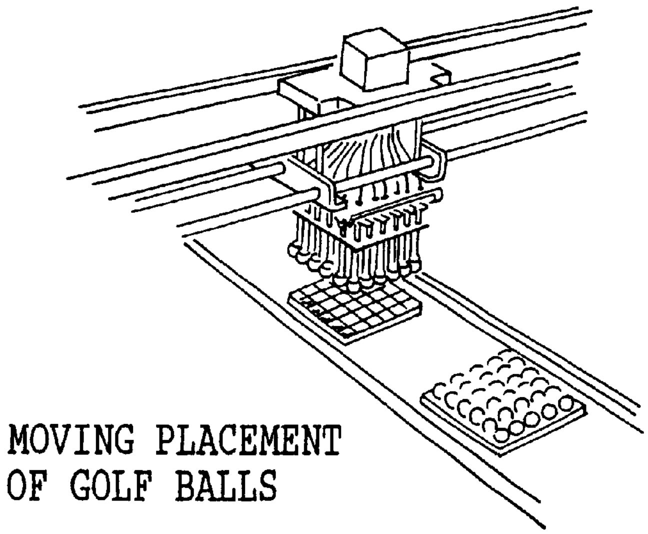
FIG. 8 is a view showing a state in which light work (a golf ball) having a rough surface is suctioned using the vacuum generating system.
Figure 9:
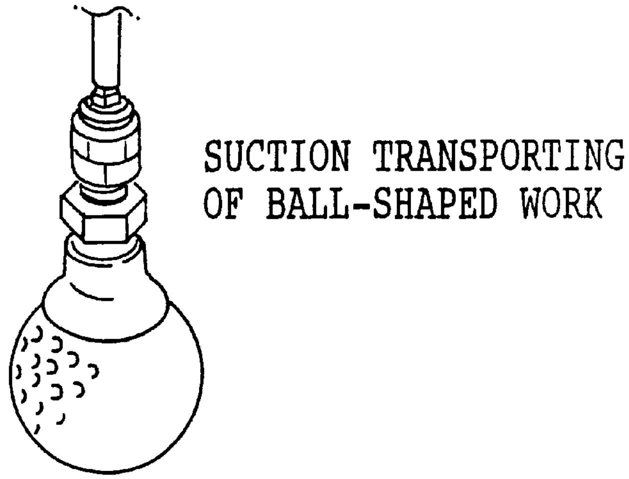
FIG. 9 is a view showing a state in which light work (a golf ball) having a rough surface is suctioned.

FIG. 6 shows a state in which work (a windshield of an automobile) that can be suctioned with certitude in a single suction operation is suctioned using the present vacuum generating system. In addition, FIG. 7 shows a state in which heavy work having a rough surface (wood) is suctioned using the present vacuum generating system. Furthermore, FIGS. 8 and 9 show a state in which light work having a rough surface (a golf ball) is suctioned.

As described above, the kind of work that can be suctioned and transported using this vacuum generating system is work which can be suctioned with certitude in a single suction operation, heavy work having a rough surface, and light work having a rough surface. At the same time, to correspond to these types of work, the vacuum generating electro-magnetic valve 62 and the vacuum release electro-magnetic valve 64 can be controlled in a plurality of operation modes (3 modes in the present embodiment, however, the present invention is not necessarily limited to three modes). Namely, programs for a plurality of operation modes are stored in the ROM 70.

Note that when work is suctioned and released, the operator needs to verify whether or not the work can be correctly suctioned and released. The operator makes this verification by actually determining with his or her own eyes the state of suction or release of the work, which is a somewhat cumbersome task.

On the other hand, when the pressure of the compressed air from the compressor 14 is set, for example, to 300 kPa, the pressure in the pressure tube 17 is about −90 kPa when the work is correctly suctioned. In contrast to this, when the work is not correctly suctioned, the pressure in the pressure tube 17 is about −5 kPa. Moreover, when the work is correctly released, the pressure in the pressure tube 17 is about 300 kPa. In contrast to this, when the work is not correctly released, the pressure in the pressure tube 17 is −90 kPa to 0 kPa.

Figure 10:
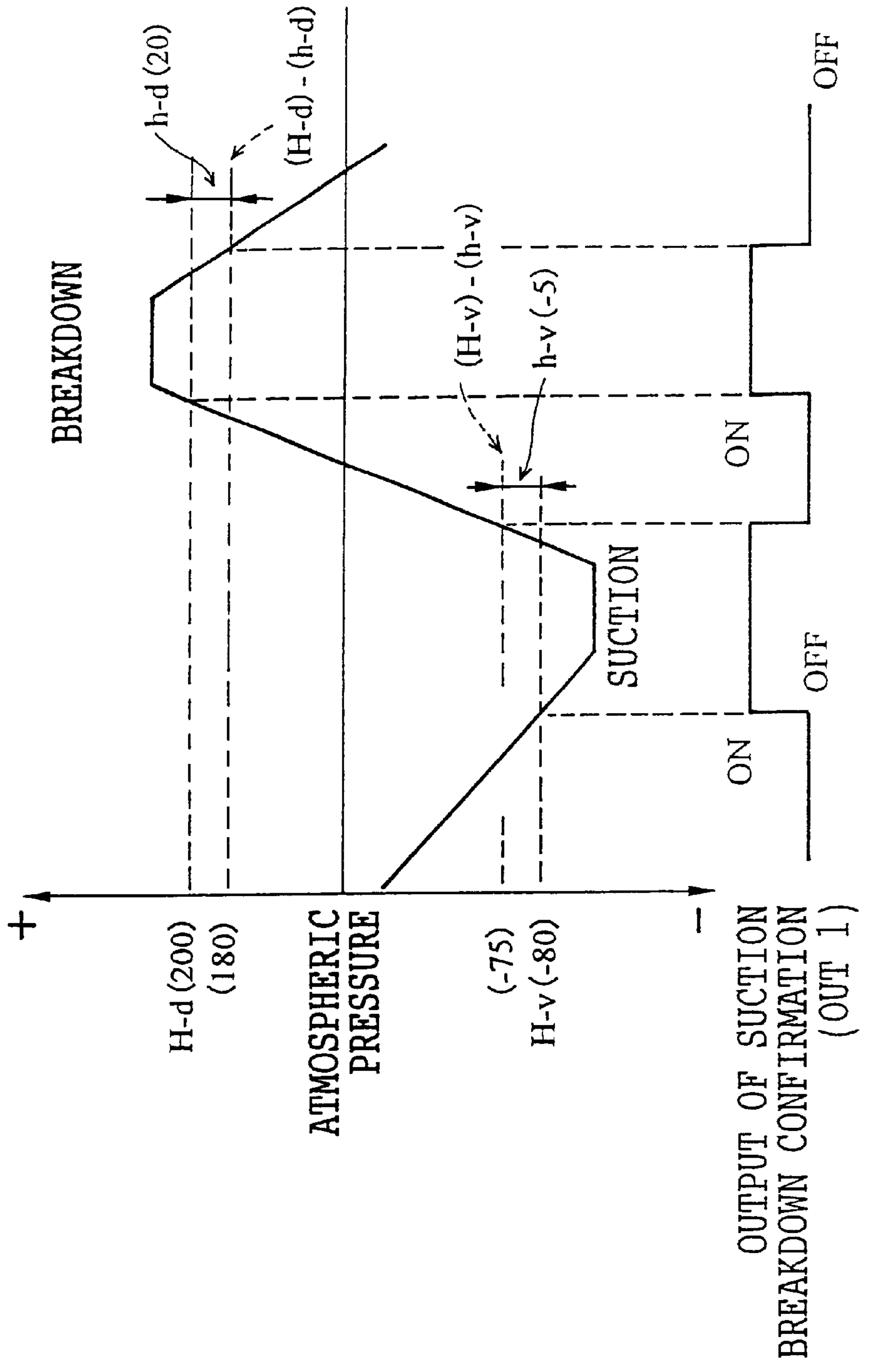
FIG. 10 is a view showing a threshold value which is set.

If the absolute value of the pressure detected inside the pressure tube 17 is greater than or equal to a suction determining value (threshold value) H−v determined to be within a range between the absolute value of −90 kPa or greater and the absolute value of −5 kPa or smaller, then a determination can be made that the work is correctly suctioned. In this embodiment, as shown in FIG. 10, the threshold value H−v on the negative pressure side is set to −80 kPa. Note that, in this embodiment, the value smaller by a predetermined value than the suction determining value H−d on the negative pressure side is set to −75 kPa. Similarly, if the absolute value of the pressure detected inside the pressure tube 17 is greater than or equal to a breakdown determining value (threshold value) H−d determined to be within a range between the absolute value of 300 kPa or less and the absolute value of 0 kPa or greater, then a determination can be made that the work is correctly suctioned. In this embodiment, as shown in FIG. 10, the breakdown determining value H−d on the positive pressure side is set to 200 kPa. Note also that, in this embodiment, the value smaller by a predetermined value than the breakdown determining value H−d on the positive pressure side is set to 180 kPa.

The setting of each of the determining values or the like on the positive pressure side and on the negative pressure side is made by setting the mode to the threshold value setting mode by the operation of a mode key 34. Then, the up key 30 and the down key 32 are operated to set the determining values. Note that the values set for the determining values or the like described above are just an example, and can be set to various values.

As described above, in the present vacuum generating system, the vacuum generating electro-magnetic valve 62 and the vacuum release electro-magnetic valve 64 can be controlled in three operation modes to correspond to various kinds of work. The operation of the mode key 34 sets the mode in which the vacuum generating electro-magnetic valve 62 and the vacuum release electro-magnetic valve 64 are controlled.

Firstly, an operation when the operation mode 2 is selected with the operation of the mode key 34 will be explained.

Figure 11:
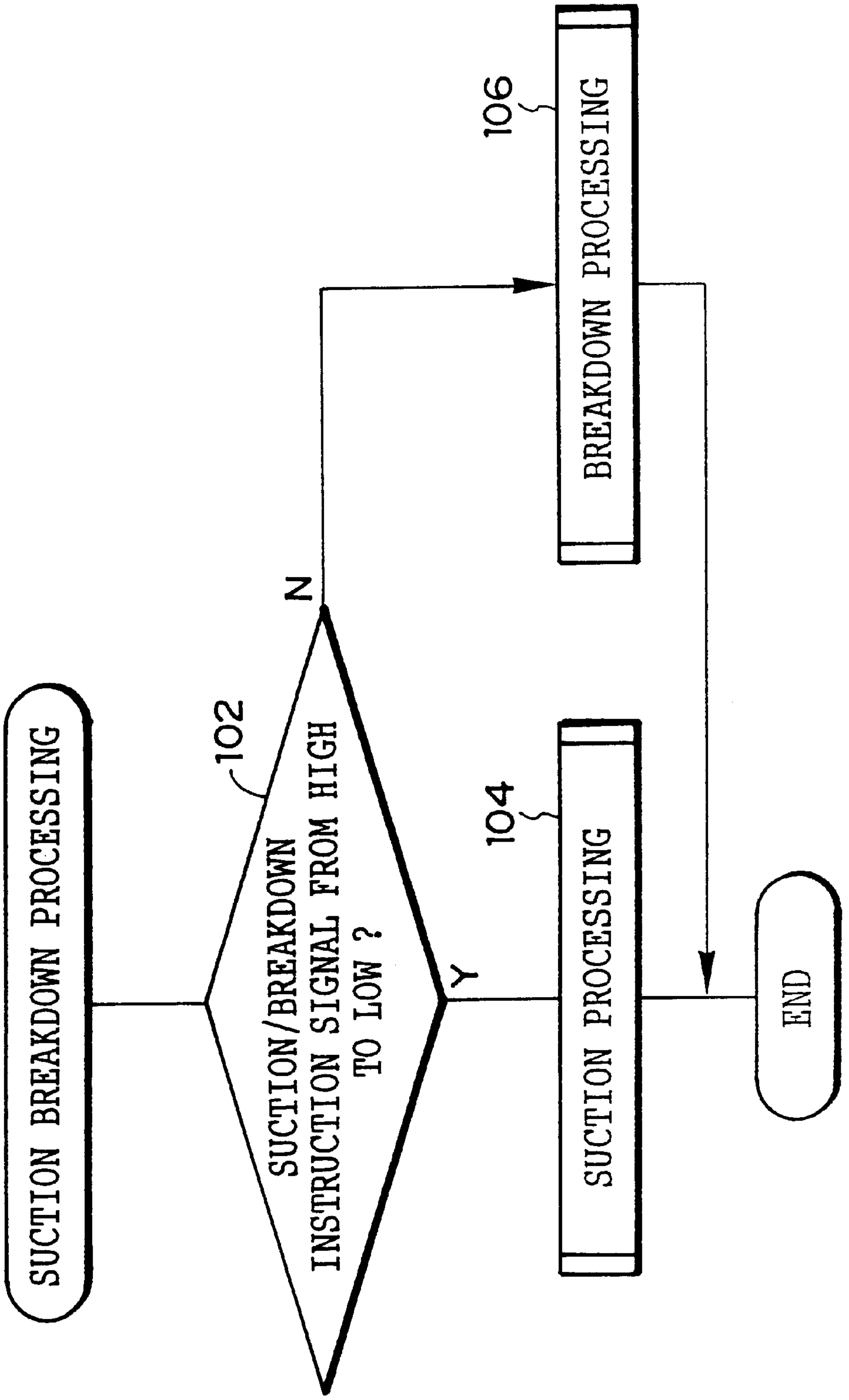
FIG. 11 is a flowchart showing a control routine of an operation mode 2 of the suction breakdown.

The operation mode 2 of the suction breakdown (see FIG. 15) starts when the state of the suction/breakdown instruction signal changes over from a high state (a state in which the value is relatively high) to a low state (a state in which the value is relatively low) or when the state is changed over from the low state to the high state. In step 102 of FIG. 11, a determination is made as to whether or not the state of the suction/breakdown instruction signal has changed over from the high state to the low state. Note that the suction/breakdown instruction signal represents a suction instruction by a change-over from the high state to the low state, while the suction/breakdown instruction signal represents a breakdown instruction by a change-over from the low state to the high state.

In step 102, when it is determined that the suction/breakdown instruction signal has changed over from the high state to a low state, the suction processing is carried out in step 104 because the suction instruction is given. If it is not determined in step 102 that the suction/breakdown instruction signal has changed over from the high state to the low state, namely, if it is determined that the suction/breakdown instruction signal has changed over from the low state to the high state, the breakdown processing is carried out in step 106 because the breakdown instruction is given.

Figure 12:
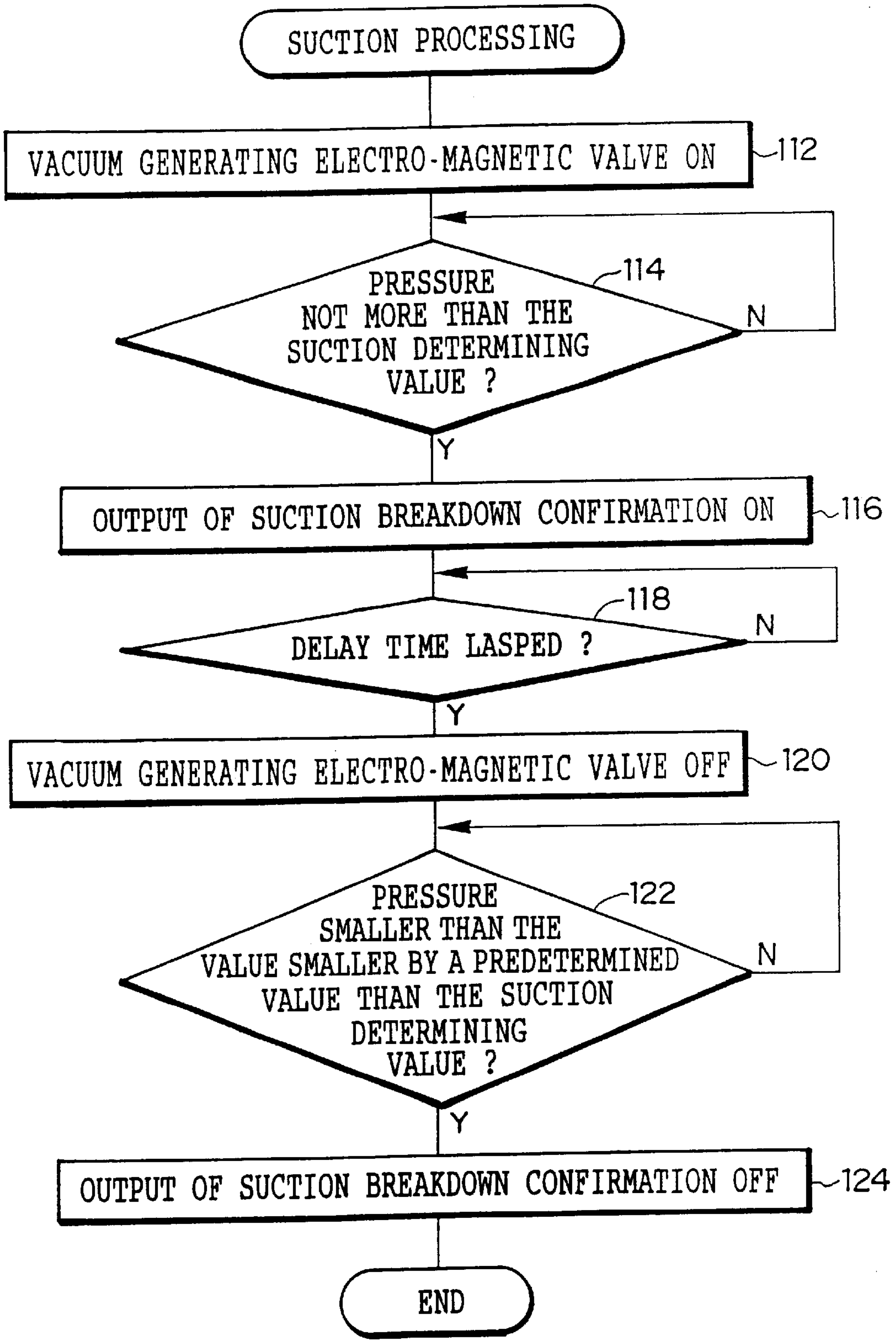
FIG. 12 is a flowchart showing a subroutine of step 104 of FIG. 11.

Next, by referring to FIGS. 12 and 15, the suction processing of step 104 will be explained. Namely, when the suction/breakdown instruction signal is changed over from the high state to the low state (T1), the vacuum generating electro-magnetic valve 62 is turned on (opened) in step 112 (Note that the vacuum release electro-magnetic valve 64 is maintained in a closed state). As a consequence, as described above, the interior of the pressure valve 17 is placed in a vacuum. Note that when the suction/breakdown instruction signal is set to the low state, the LED 38 is lit as described above. In step 114, it is determined as to whether or not the pressure (negative pressure) inside the pressure tube 17 which is detected by the pressure detection element 80 is greater than or equal to the suction determining value H−v. If the pressure (negative pressure) inside the pressure tube 17 is greater than or equal to the suction determining value H−v (is greater than or equal to the absolute value thereof) (T2), it is determined that the work can be accurately suctioned. In step 116, the output of the suction breakdown confirmation is turned on (high state). As a consequence, it can be determined on the outside (by a sequencer or the like) that the work can be accurately suctioned. Note that, as described above, when the output of the suction confirmation is turned on (high state), the LED 40 is lit (the same holds true of the following).

In step 118, a determination is made as to whether or not a set delay time t1 has passed from the time (T2) when the output of the suction breakdown confirmation was turned on. If the set delay time t1 has passed from the time (T2) when the suction breakdown confirmation output is turned on (T3), the vacuum generating electro-magnetic valve 62 is turned off.

In this manner, the amount of compressed air consumed can be suppressed by turning off the vacuum generating electro-magnetic valve 62.

Figure 15:
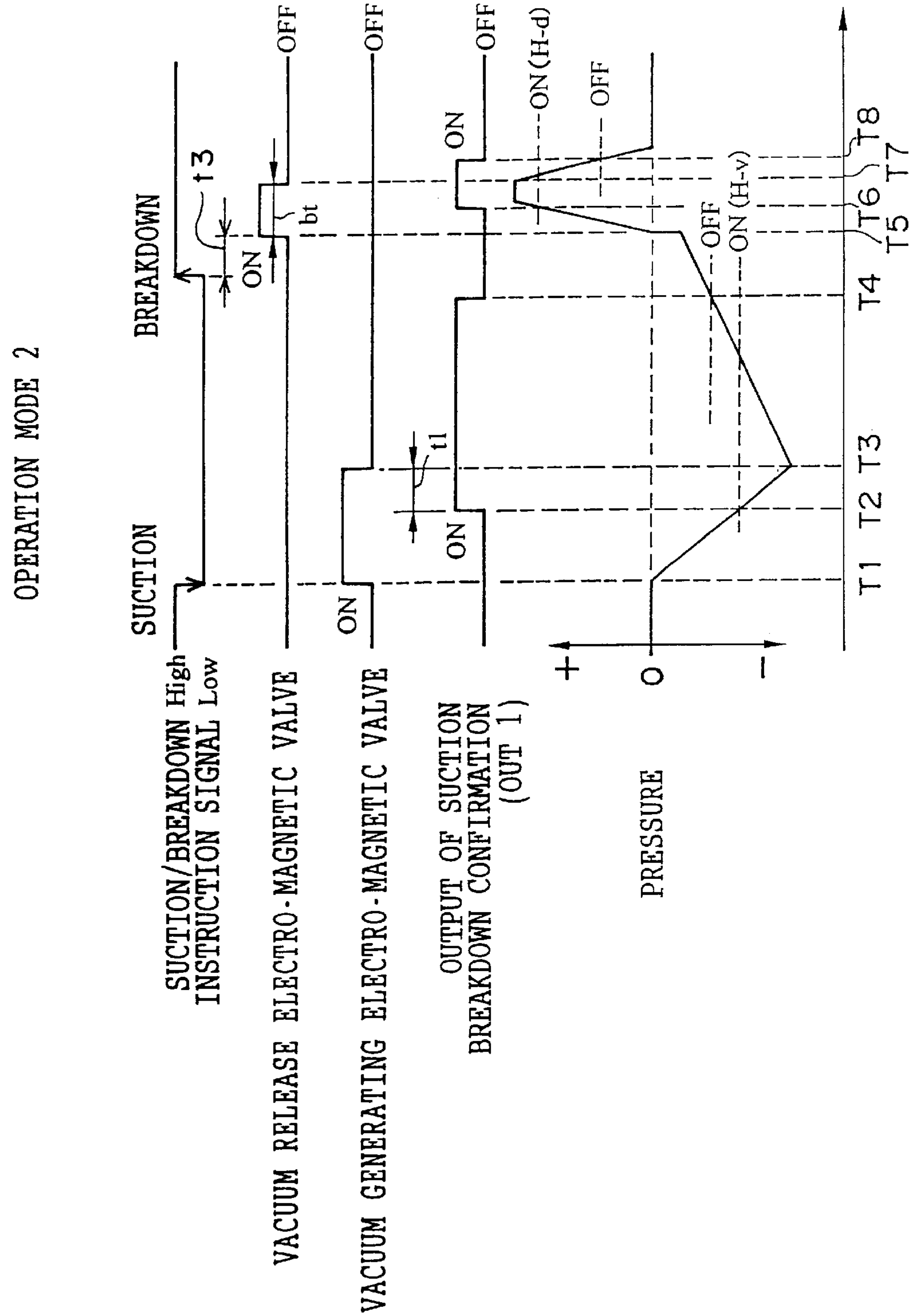
FIG. 15 is a view showing a timing chart of an operation mode 2 of the suction breakdown.

In this manner, when the vacuum generating electro-magnetic valve 62 is turned off, air flows into the pressure tube 17 from the side of the diffuser 88 with the result that, as shown in FIG. 15 (see T3 and thereafter), the pressure (negative pressure) is reduced (the absolute value thereof is reduced). In step 122, a determination is made as to whether or not the pressure in the pressure tube 17 is less (the absolute value thereof is smaller) than the value smaller by a predetermined value than the suction determining value H−v. If the pressure in the pressure tube 17 is less the absolute value thereof is smaller than the value smaller by the predetermined value than the suction determining value H−v (T4), the output of the suction breakdown confirmation is turned off (low state) in step 124.

Figure 13:
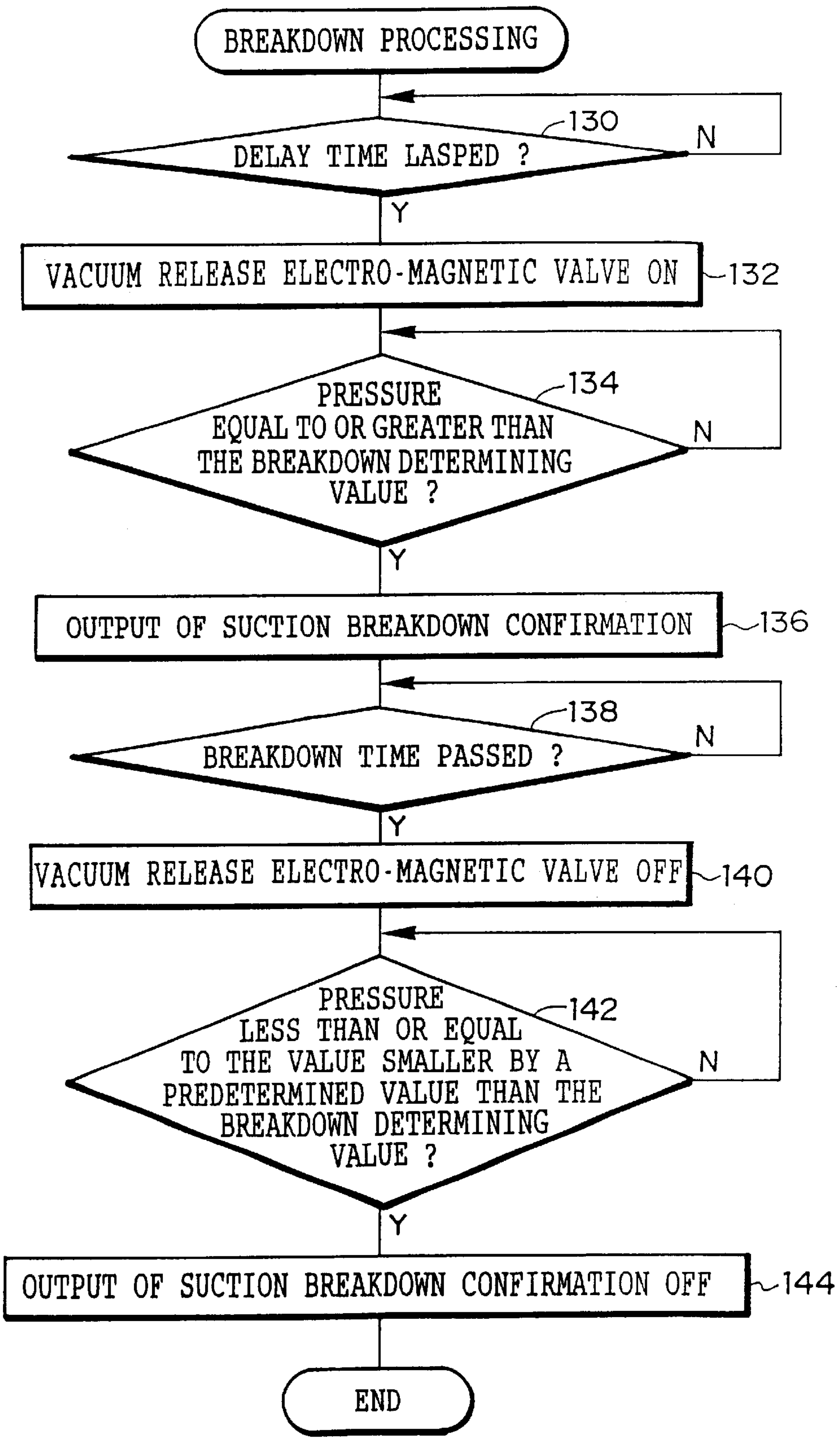
FIG. 13 is a flowchart showing a subroutine of step 106 of FIG. 11.

Next, the breakdown processing in step 106 will be explained with reference to FIGS. 13 and 15. In other words, when the suction/breakdown instruction signal is changed over from the low state to the high state, it is determined in step 130 whether or not the predetermined delay time t3 has passed. If the predetermined delay time t3 has passed (T5), the vacuum release electro-magnetic valve 64 is turned on (opened) in step 132. At this time (T5), as shown in FIG. 15, the vacuum generating electro-magnetic valve 62 is turned off (closed). As a consequence, the compressed air is allowed to flow into the pressure tube 17 as described above to provide positive pressure.

Here, the reason why the vacuum release electro-magnetic valve 64 is turned on (opened) when the delay time t3 has passed (T5) from the time when the suction/breakdown instruction signal is changed over from the low state to the high state, is because, when the suction/breakdown instruction signal is changed over from the low state to the high state, the vacuum release electro-magnetic valve 64 immediately turned on, and the compressed air allowed to flow into the pressure tube 17 to provide a positive pressure, if the work being suctioned is light, then that light work might be blown away somewhere. Therefore, the vacuum release electro-magnetic valve 64 is turned on in an anticipation of the time (the delay time t3 described above) when the pressure in the pressure tube 17 will have come close to the atmospheric pressure after the suction/breakdown instruction signal has changed over from the low state to the high state.

In step 134, a determination is made as to whether or not the pressure detected in the pressure tube 17 (positive pressure) by the pressure detection element 80 is equal to or greater than the breakdown determining value. If the pressure (positive pressure) in the pressure tube 17 is equal to or greater than the breakdown determining value H−d (equal to or greater than the absolute value thereof) (T6), it is determined that the work can be accurately released, and the suction breakdown confirmation output is turned on (high state).

In step 138, a determination is made as to whether or not the set breakdown time bt has passed from the time (T5) the vacuum release electro-magnetic valve was turned on. If the set breakdown time bt has elapsed from the time (T5) the vacuum release electro-magnetic valve 64 was turned on (T7), the vacuum release electro-magnetic valve 64 is turned off.

In this manner, when the vacuum release electro-magnetic valve 64 is turned off, air flows into the pressure tube 17 from the diffuser side 88 with the result that the pressure (positive pressure) is reduced (namely, the absolute value thereof becomes smaller, i.e. approaches atmospheric pressure) as shown in FIG. 15 (see T7 and thereafter). In step 142, a determination is made as to whether or not the value of pressure in the pressure tube 17 is smaller than a value smaller than the breakdown determining value H−d by a predetermined value (i.e. the absolute value thereof is smaller). If the pressure in the pressure tube 17 is smaller than a value smaller than the breakdown determining value H−d by the predetermined value (i.e. the absolute value thereof is smaller) (T8), the suction breakdown confirmation output is turned off (low state) in step 144.

As described above, when the delay time t1 has passed since the pressure (negative pressure) in the pressure tube 17 has reached the suction determining value H−v (T3), the vacuum generating electro-magnetic valve 62 is turned off and the amount of compressed air consumed thereafter is suppressed. As a result, operation mode 2 is preferably applied to the suction of work which can be reliably suctioned in a single suction operation such as an automobile windshield, as shown in FIG. 6.

Next, operation modes 1 and 3 will be explained. Since parts of operation modes 1 and 3 are similar to operation mode 2, a detailed explanation of the similar parts will be omitted.

In operation mode 3 (see FIG. 16) the vacuum generating electro-magnetic valve 62 when the suction/breakdown instruction signal changes over from a high state to a low state. If the pressure (negative pressure) in the pressure tube 17 is equal to or greater than the suction determining value H−v (i.e. equal to or greater than the absolute value thereof), the suction breakdown confirmation output is turned on (high state) Unlike in operation mode 2, in operation mode 3 the vacuum generating electro-magnetic valve 62 is not turned off even when the delay time has passed since the suction breakdown confirmation output was turned on. On the other hand, when the suction/breakdown instruction signal changes over from the low state to the high state, the vacuum generating electro-magnetic valve 62 is turned off (closed). When a predetermined delay time t3 has passed since the suction/breakdown instruction signal changes over from the low state to the high state, the vacuum release electro-magnetic valve 64 is turned on (opened). As a result of this, compressed air flows into the pressure tube 17 so that the pressure in the pressure tube 17 is reduced to less than the value smaller than the suction determining value H−V by a predetermined value (i.e. the absolute value thereof is smaller) and the output of the suction breakdown confirmation is turned off (low state). If the pressure (positive pressure) in the pressure tube 17 is equal to or greater than the breakdown determining value H−d (i.e. is equal to or greater than the absolute value thereof), the output of the suction breakdown confirmation is turned on (high state). When the set breakdown time bt has passed since the vacuum release electro-magnetic valve 64 was turned on, the vacuum release electro-magnetic valve 64 is turned off.

Figure 16:
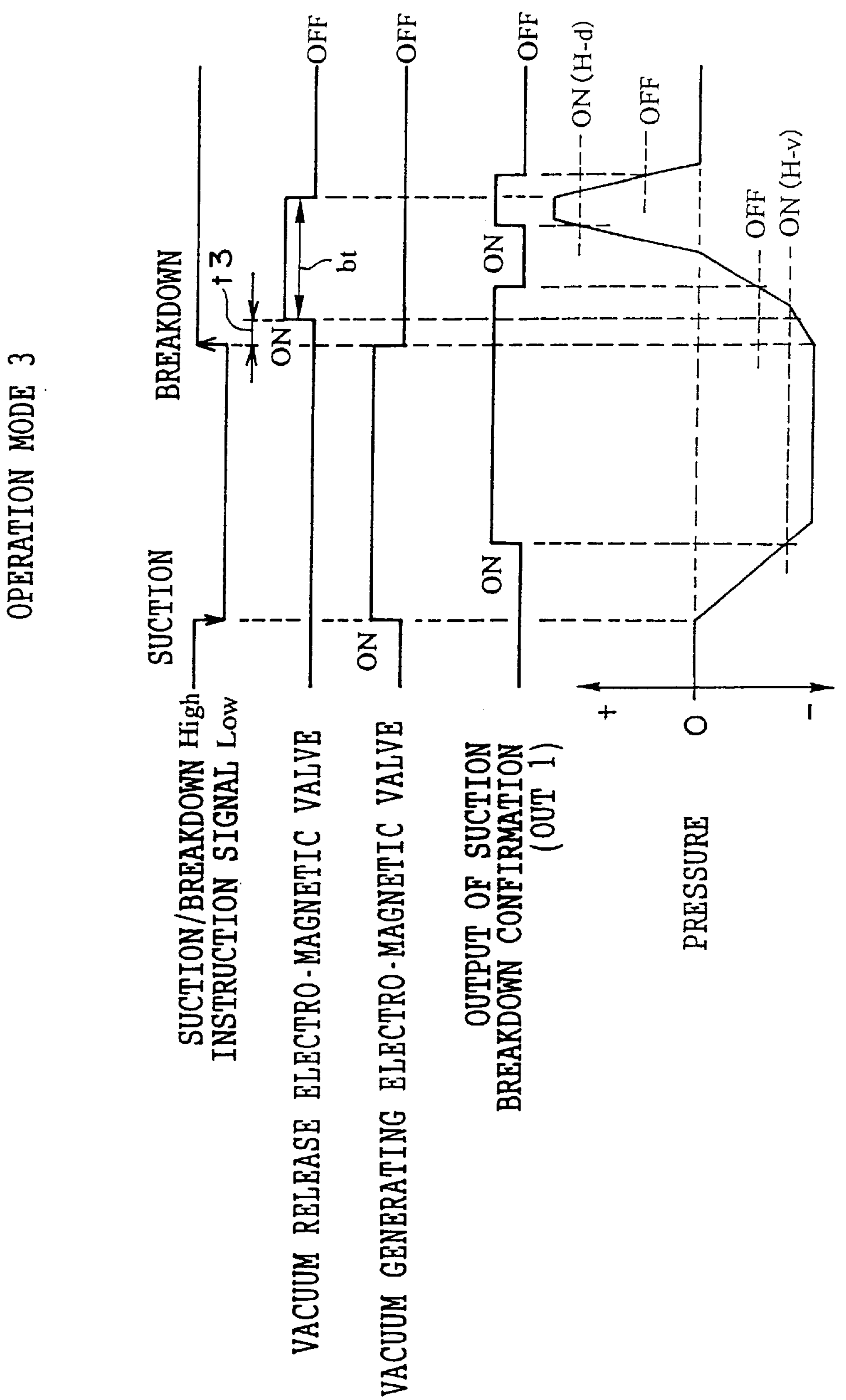
FIG. 16 is a view showing a timing chart of an operation mode 3 of the suction breakdown.

As described above, in operation mode 3, the vacuum generating electro-magnetic valve 62 is turned on when the suction/breakdown instruction signal changes over from a high state to a low state, as shown in FIG. 16. Since the ON state of the vacuum generating electro-magnetic valve 62 is maintained until the suction/breakdown instruction signal changes over from the low state to the high state, operation mode 3 is suitable for cases in which heavy work having a rough surface (e.g. wood) is suctioned.

Figure 14:
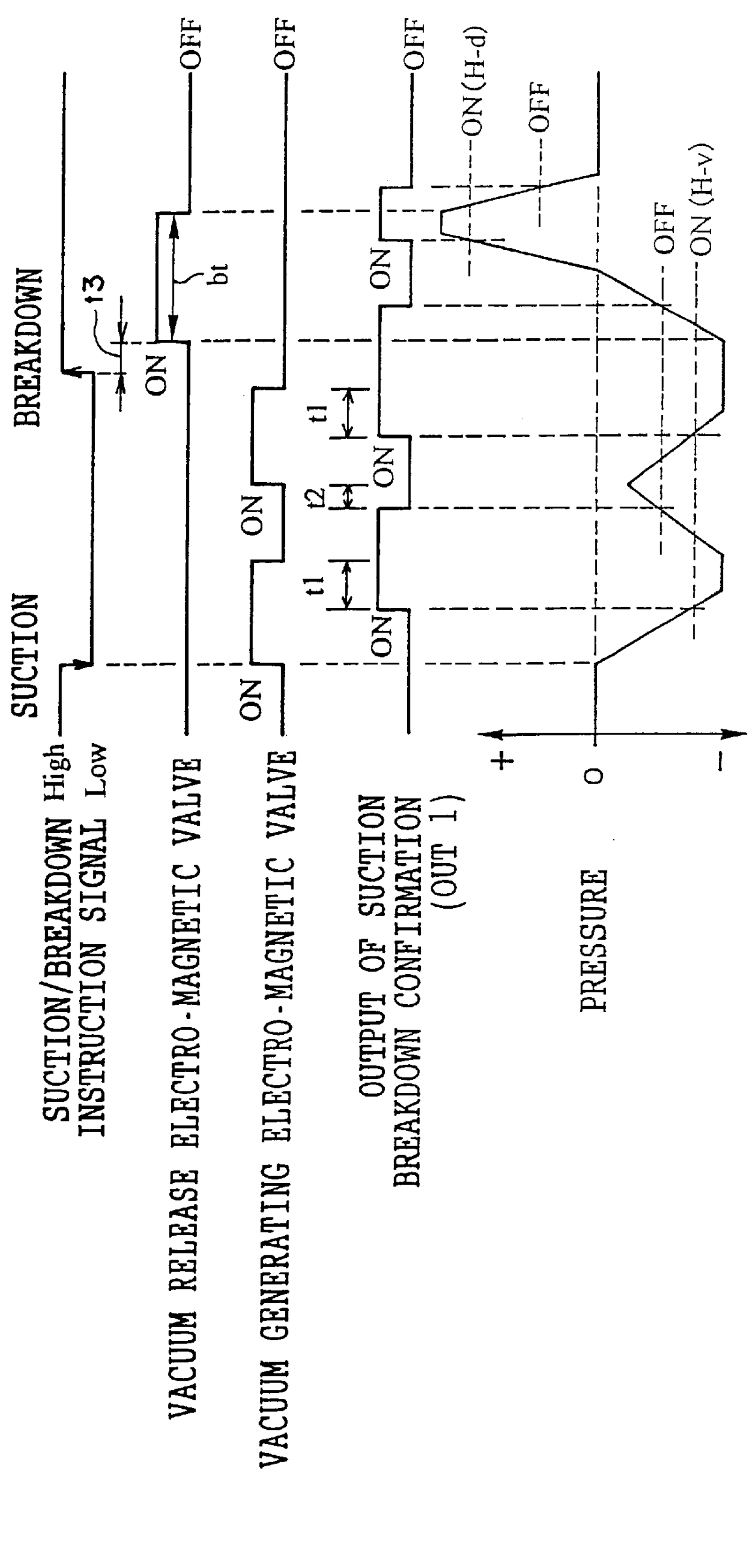
FIG. 14 is a view showing a timing chart of an operation mode 1 of the suction breakdown.

In operation mode 1 (see FIG. 14), when the suction/breakdown instruction signal changes over from the high state to the low state, the vacuum generating electro-magnetic valve 62 is turned on (opened). If the pressure (negative pressure) in the pressure tube 17 is equal to or greater than the suction determining value H–v, the output of the suction breakdown confirmation is turned on (high state). When the delay time t1 has passed since the output of the suction breakdown confirmation was turned on, the vacuum generating electro-magnetic valve 62 is turned off. When the vacuum generating electro-magnetic valve 62 is turned off in this manner, air flows from the side of the diffuser 88 into the pressure tube 17 with the result that the pressure (negative pressure) in the pressure tube 17 is lessened (i.e. the absolute value of the pressure is decreased). When the pressure in the pressure tube 17 is equal to or more than a value smaller than the suction determining value H–v by a predetermined value (i.e. the absolute value thereof is smaller), the output of the suction breakdown confirmation is turned off (low state). Unlike in operation mode 2, in operation mode 1 the vacuum generating electro-magnetic valve 62 is again turned on (opened) when the set delay time t2 has passed since the output of the suction breakdown confirmation was turned off, and the above processing is repeated. Note that, since the breakdown processing of operation mode 1 is the same as the breakdown processing of operation mode 3, an explanation thereof is omitted.

As described above, since the ON and OFF switching of the vacuum generating electro-magnetic valve 62 during the suction operation is repeated in operation mode 1, operation mode 1 is suitable in cases in which light work having a rough surface (for example, a golf ball) is suctioned. Note that in this case also, the vacuum release electro-magnetic valve is turned on in anticipation of the time (the above delay time t3) until the pressure in the pressure tube 17 comes close to the atmospheric pressure after the suction/breakdown instruction signal has changed over from the low state to the high state. Thus, the light work is prevented from being ejected. This is particularly preferable in operation mode 1 which is suitable for cases in which light work such as a golf ball or the like is absorbed.

In addition, in the above operation modes 1 through 3, it is not always necessary to wait for the delay time t3 after the suction/breakdown instruction signal has changed over from the low state to the high state. The vacuum release electro-magnetic valve 64 may be turned on immediately when the suction/breakdown instruction signal changes over from the low state to the high state.

Figure 17:
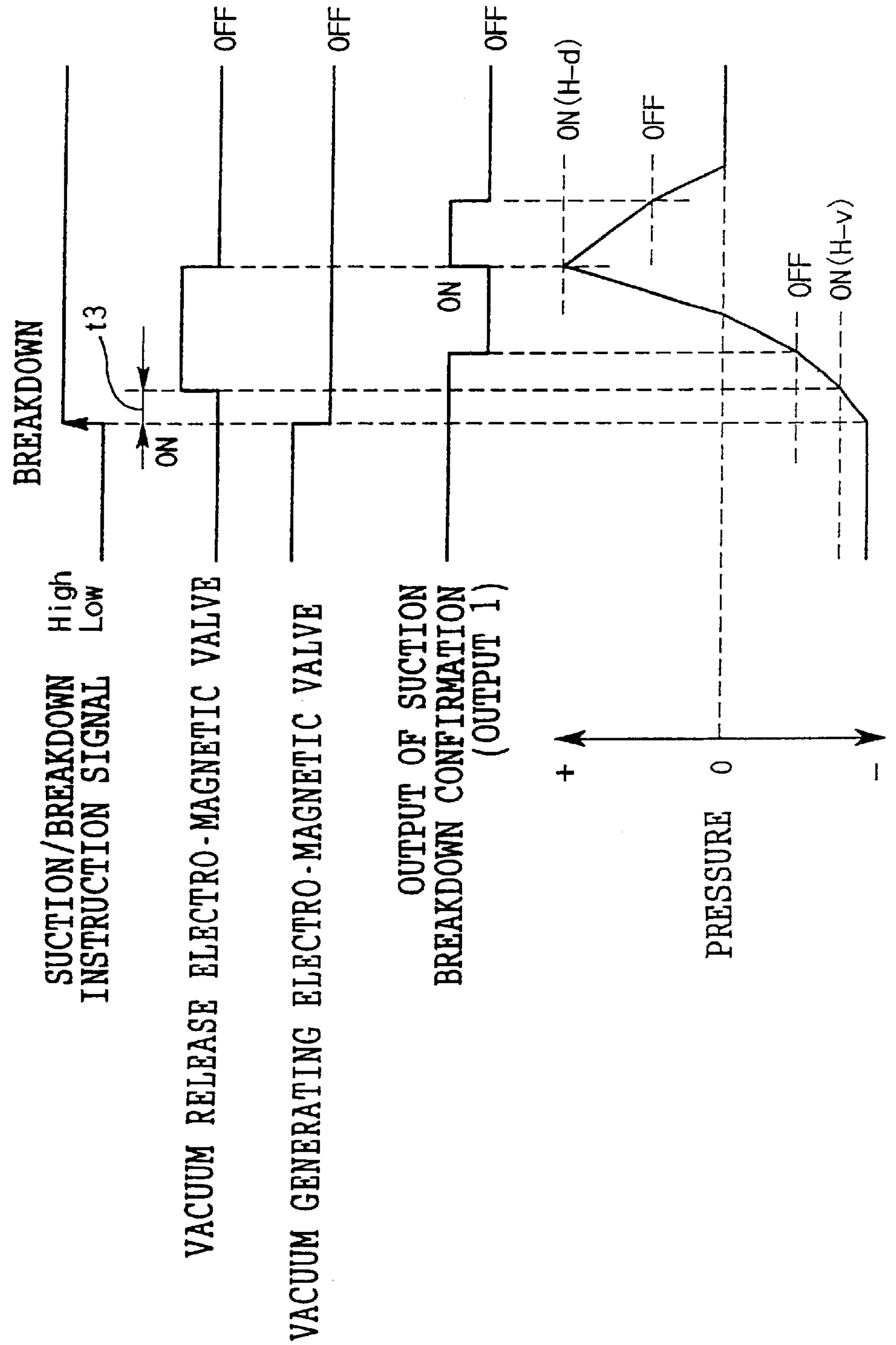
FIG. 17 is a view showing a timing chart of a variant example of the operation modes 1 through 3.

Note that, in each of the above operation modes 1 through 3, the vacuum release electro-magnetic valve 64 is turned off when the set breakdown time bt has passed since the vacuum release electro-magnetic valve 64 was turned on. However, as is shown in FIG. 17, the timing for turning off the vacuum release electro-magnetic valve 64 after the vacuum release electro-magnetic valve 64 has been turned on may be synchronized with the suction breakdown signal (i.e. the ON signal on the breakdown side) (namely, with when the pressure (positive pressure) inside the pressure tube 17 is equal to or greater than the breakdown determining value H–d) without using the breakdown time bt.

Note also that, in the above operation modes 1 through 3, the delay times t1, t2 and t3 and the breakdown time bt can be arbitrarily set by the operation of the mode key 34, the up key 30 and the down key 32. Furthermore, in each of the above operation modes 1 through 3, the detected pressure value in the pressure tube 17 can be displayed on the display portion 36.

As explained above, in the present embodiment, the pressure sensor device can decrease the control load of an external sequencer or the like because the vacuum generating electro-magnetic valve and the vacuum release electro-magnetic valve are controlled on the basis of the change-over of the suction/breakdown instruction signal between a high state and a low state.

Furthermore, in the present embodiment, since the state of the suction/breakdown signal is changed over from the low state to the high state when the positive or detected inside a pressure tube are equal to or grater than a determined value, the fact that the positive pressure or negative pressure inside the pressure tube are at a determined value or greater can be output using only the suction breakdown signal, enabling the number of signal lines for outputting the state of the pressure inside the pressure tube to be reduced to one.

As explained above, in these embodiments, the vacuum generating electro-magnetic valve is turned on when the suction/breakdown instruction signal changes over from a high state to a low state, and the vacuum release electro-magnetic valve is turned on when the suction/breakdown instruction signal changes over from a low state to a high state. However, the present invention is not limited to this. The vacuum generating electro-magnetic valve may be turned on when the suction/breakdown instruction signal changes over from a low state to a high state, and the vacuum release electro-magnetic valve may be turned on when the suction/breakdown instruction signal changes over from a high state to a low state.

Furthermore, in the above embodiments, the state of the suction/breakdown instruction signal is changed over from a low state to a high state when the positive pressure or negative pressure detected in the pressure tube is equal to or more than a determined value. However, the present invention is not limited to this. The state of the suction/breakdown instruction signal may be changed over from a high state to a low state when the positive pressure or negative pressure detected in the pressure tube is equal to or more than the determined value.

What is claimed is:

1. A pressure sensor device for detecting positive pressure and negative pressure in a pressure tube, and which is provided in a pressure-generating apparatus for placing the interior of a pressure tube in a negative pressure state using a negative pressure-generating valve for generating negative pressure and for placing the interior of a pressure tube in a positive pressure state using a positive pressure-generating valve for generating positive pressure, the pressure sensor device comprising:

an input device for inputting from outside the pressure generating device an instruction signal in which a first state change-over from one of a high state having a relatively large value or a low state having a relatively small value to the other of the high state having a relatively large value or the low state having a relatively small value represents an instruction to generate negative pressure, and in which a second state change-over from the other of the high state having a relatively large value or the low state having a relatively small value to the one of the high state having a relatively large value or the low state having a relatively small value represents an instruction to generate positive pressure; and a control device for controlling the negative pressure-generating valve and the positive pressure-generating valve based on the first state change-over and the second state change-over of the instruction signal input by the inputting device.

2. A pressure sensor device according to claim 1, wherein the control device controls the negative pressure-generating valve and the positive pressure-generating valve according to an operation mode selected from a plurality of operation modes.

3. A pressure sensor device according to claim 1, wherein the control device opens a negative pressure-generating valve on the basis of the first state change-over and closes the negative pressure-generating valve after the lapse of a predetermined time before the second change-over after the value of the negative pressure generated in the pressure tube by the opening of the negative pressure-generating valve has become equal to or greater than a threshold value on the negative pressure side.

4. A pressure sensor device according to claim 3, further comprising a setting device for setting at least one of the threshold value and the predetermined time.

5. A pressure sensor device according to claim 1, wherein the positive pressure-generating valve is opened after the lapse of a predetermined delay time since the second state change-over was made.

6. A pressure sensor device according to claim 1, wherein the control device opens the positive pressure-generating valve based on the second state change-over, and closes the positive pressure-generating valve when the value of positive pressure generated in the pressure tube by the opening of the positive pressure generating valve is equal to or greater than a threshold value on the positive pressure side.

7. A pressure sensor device according to claim 1, comprising an output device for outputting a pressure state signal representing a state of the positive pressure and a state of the negative pressure in the pressure tube via a single output line.

8. A pressure sensor device according to claim 7, further comprising:

determining means for determining whether or not positive pressure detected in a pressure tube is equal to or greater than a threshold value on the positive pressure side, and for determining whether or not negative pressure detected in a pressure tube is equal to or greater than a threshold value on the negative pressure side;

wherein, when the determining means has determined that the positive pressure detected inside a pressure tube is equal to or greater than a threshold value on the positive pressure side, the output device changes a pressure state signal from one of a high state having a relatively large value or a low state having a relatively small value to the other of the high state having a relatively large value or the low state having a relatively small value and outputs the signal, and when the determining means has determined that negative pressure detected inside a pressure tube is equal to or greater than a threshold value on the negative pressure side, the output device changes a pressure state signal from the other of the high state or the low state to the one of the high state or the low state and outputs the signal.

9. A pressure sensor device according to claim 8, further comprising a setting device for setting at least one of the threshold value on the positive pressure side and the threshold value on the negative pressure side.

10. A pressure sensor device according to claim 9, wherein, when the determining means has determined that the detected positive pressure is equal to or greater than a threshold value on the positive pressure side, the determining means further determines whether or not the detected positive pressure is equal to or less than a value smaller by a predetermined value than the threshold value on the positive pressure side, and, when the determining means has determined that the detected negative pressure is equal to or greater than a threshold value on the negative pressure side, the determining means further determines whether or not the detected negative pressure is equal to or less than a value smaller by a predetermined value than the threshold value on the negative pressure side and, wherein, when the determining means has determined that the detected positive pressure is equal to or less than a value smaller by a predetermined value than the threshold value on the positive pressure side, the output device changes a pressure state signal from one of a high state or a low state to the other of the high state or the low state and outputs the signal, and when the determining means has determined that detected negative pressure is equal to or less than a value smaller by a predetermined value than the threshold value on the negative pressure side, the output device changes a pressure state signal from the other of the high state or the low state to the one of the high state or the low state and outputs the signal.

11. A pressure sensor device for detecting positive pressure and negative pressure in a pressure tube, and which is provided in a pressure-generating apparatus for placing the interior of a pressure tube in a negative pressure state using a negative pressure-generating valve for generating negative pressure and for placing the interior of a pressure tube in a positive pressure state using a positive pressure-generating valve for generating positive pressure, the pressure sensor device comprising:

an output device for outputting a pressure state signal representing a state of the positive pressure and the negative pressure in the pressure tube via a single output line.

12. A pressure sensor device according to claim 11, further comprising:

determining means for determining whether or not positive pressure detected in a pressure tube is equal to or grater than a threshold value on the positive pressure side, and for determining whether or not negative pressure detected in a pressure tube is equal to or greater than a threshold value on the negative pressure side;

wherein, when the determining means has determined that the positive pressure detected inside a pressure tube is equal to or greater than a threshold value on the positive pressure side, the output device changes a pressure state signal from one of a high state having a relatively large value or a low state having a relatively small value to the other of the high state having a relatively large value or the low state having a relatively small value and outputs the signal, and when the determining means has determined that negative pressure detected inside a pressure tube is equal to or greater than a threshold value on the negative pressure side, the output device changes a pressure state signal from the other of the high state or the low state to the one of the high state or the low state and outputs the signal.

13. A pressure sensor device according to claim 12, wherein, when the determining means has determined that the detected positive pressure is equal to or greater than a threshold value on the positive pressure side, the determining means further determines whether or not the detected positive pressure is equal to or less than a value smaller by a predetermined value than the threshold value on the positive pressure side, and, when the determining means has determined that the detected negative pressure is equal to or greater than a threshold value on the negative pressure side, the determining means further determines whether or not the detected negative pressure is equal to or less than a value smaller by a predetermined value than the threshold value on the negative pressure side and, wherein, when the determining means has determined that the detected positive pressure is equal to or less than a value smaller by a predetermined value than the threshold value on the positive pressure side, the output device changes a pressure state signal from one of a high state or a low state to the other of the high state or the low state and outputs the signal, and when the determining means has determined that detected negative pressure is equal to or less than a value smaller by a predetermined value than the threshold value on the negative pressure side, the output device changes a pressure state signal from the other of the high state or the low state to the one of the high state or the low state and outputs the signal.

14. A pressure sensor device according to claim 13, further comprising a setting device for setting at least one of the threshold value on the side of the positive pressure and the threshold value on the side of the negative pressure.

15. A suction release apparatus comprising:

a pressure generating apparatus provided with the pressure sensor device according to claim 1; and a pad connected to the pressure generating apparatus via the pressure tube for suctioning work using negative pressure in the pressure tube and releasing the suction of the work using positive pressure in the pressure tube.

* * * * *